Patented Nov. 2, 1937

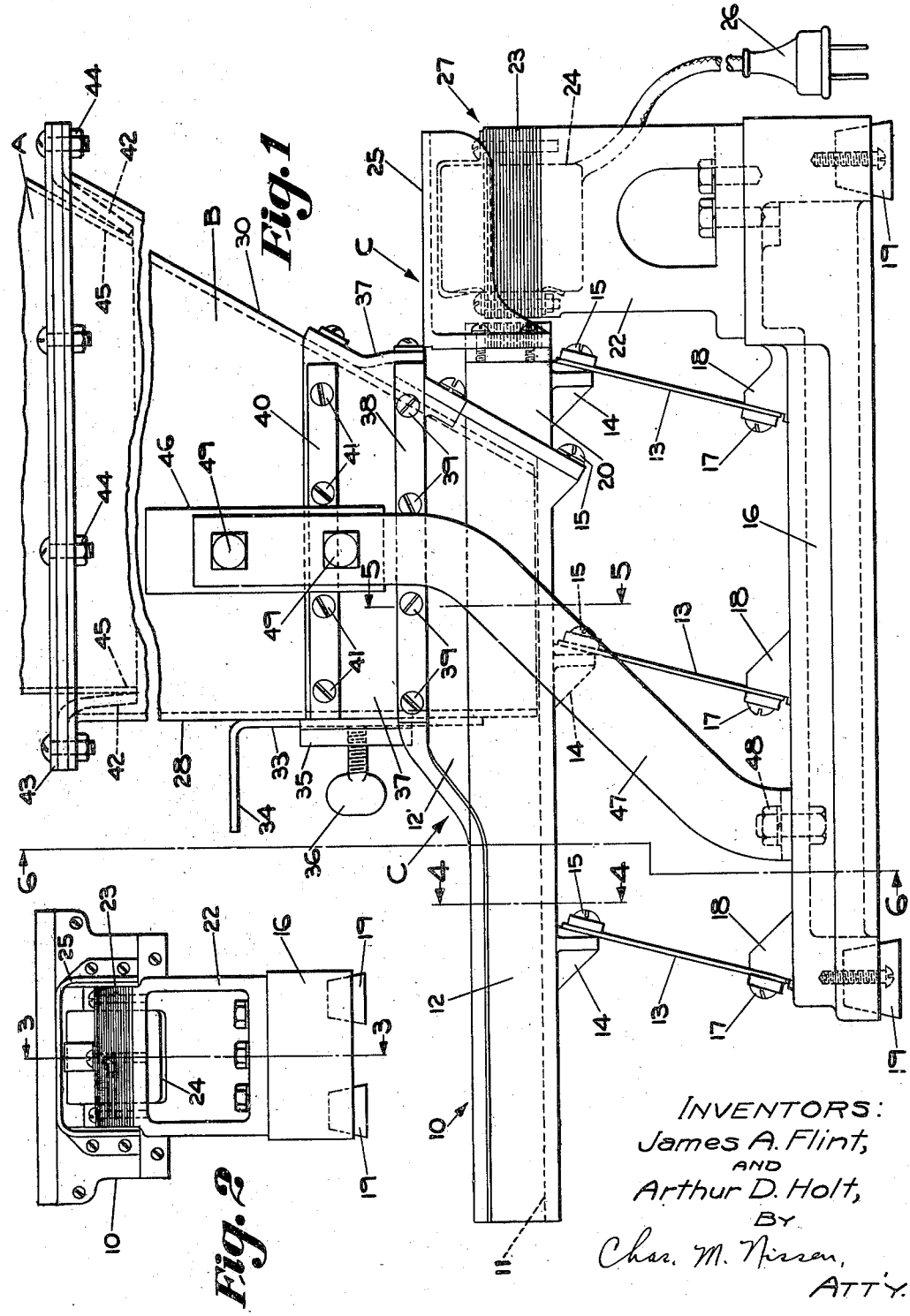

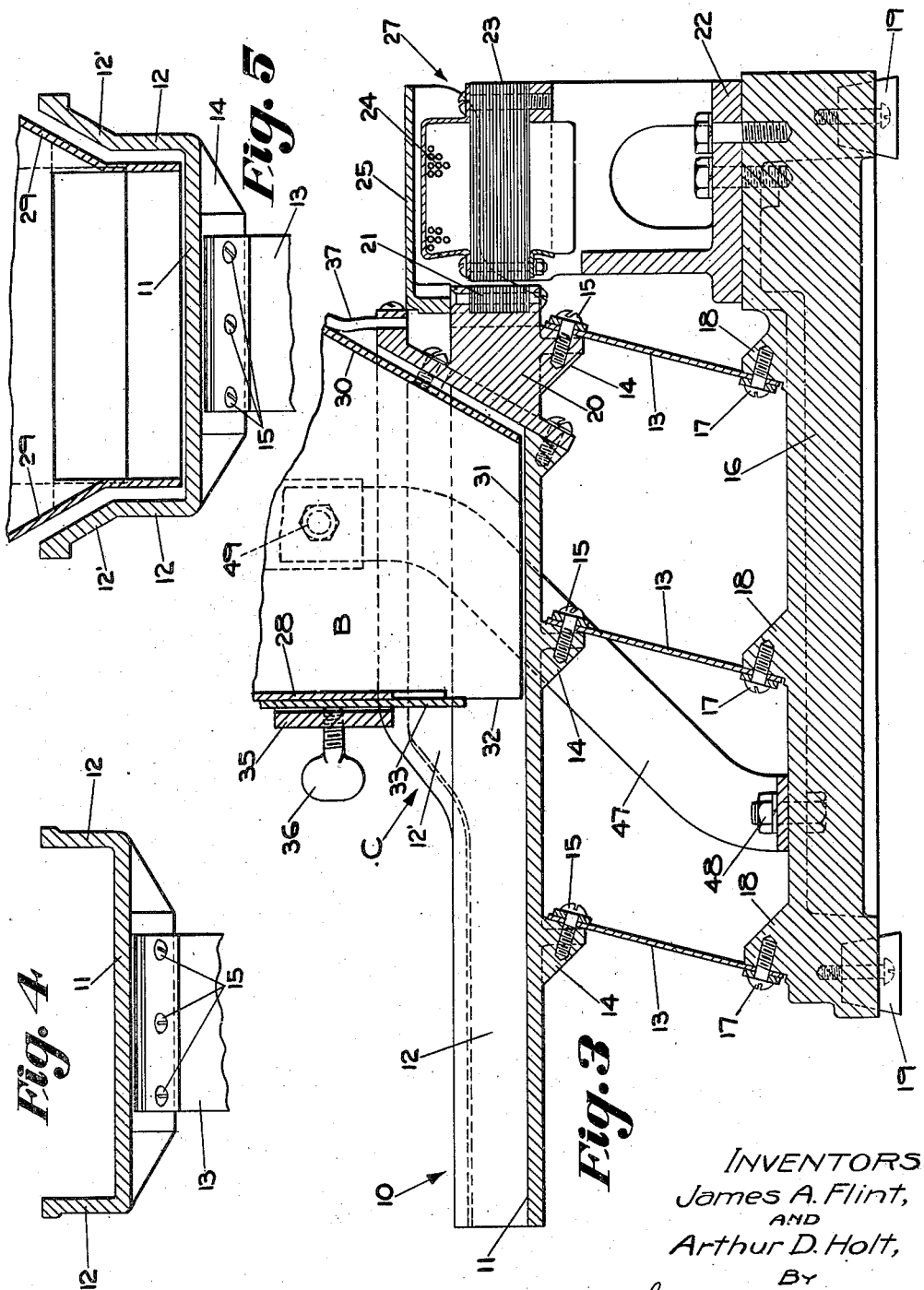

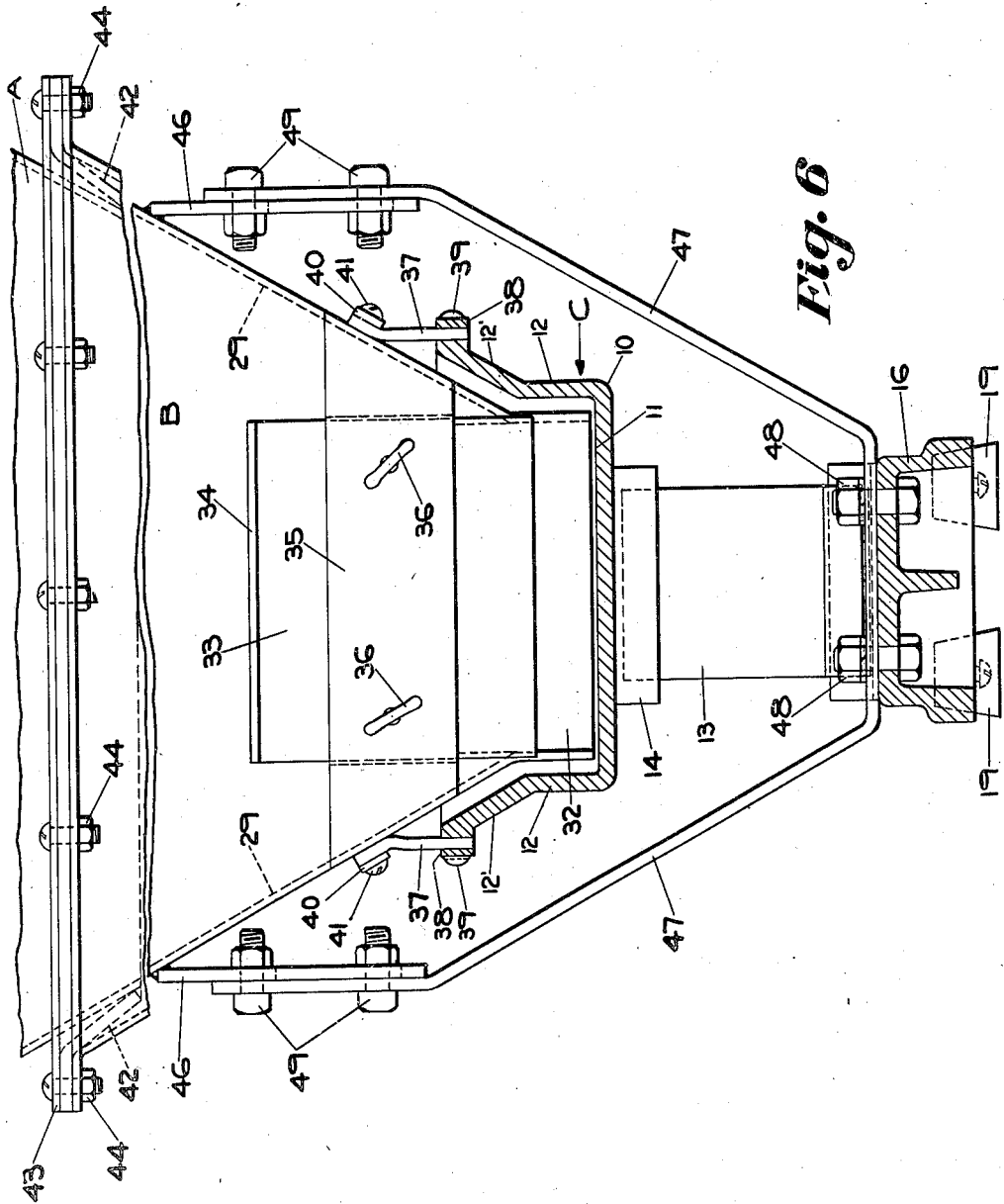

2,098,034

UNITED STATES PATENT OFFICE 2,098,034

VIBRATORY FEEDER

James A. Flint and Arthur D. Holt, Columbus, Ohio, assignors to The Traylor Vibrator Company, a corporation of Colorado Application April 19, 1935, Serial No. 17,244

24 Claims. (Cl. 198—56)

An object of the invention is to provide a feeding mechanism, particularly of the vibratory type, which will feed material, such as granular material, from a hopper to any desired point of delivery at a substantially constant rate.

A more specific object of the invention is to provide an auxiliary hopper in combination with a stationary hopper and a vibratory feeder, which auxiliary hopper is subjected to vibrations whereby there will be a constant supply of material to be fed by the conveyor.

Other objects of the invention will appear hereinafter, the novel features and combinations being set forth in the appended claims.

In the drawings:

Fig. 1 is a side elevational view of the device of our invention;

Fig. 2 is a rear end elevational view of the device of our invention with certain parts omitted;

Fig. 3 is a side elevational sectional view of the device of Fig. 1 taken on the line 3—3 of Fig. 2;

Fig. 4 is a sectional view on the line 4—4 of Fig. 1;

Fig. 5 is a sectional view on the line 5—5 of Fig. 1; and

Fig. 6 is a sectional view on the line 6—6 of Fig. 1.

Vibratory feeders have been employed to feed granular material, and similar materials which are found in small particles, from a stationary source, such as a hopper, to a container or a receptacle. It has been discovered that in practice there is often a tendency for the material to become clogged in the bottom of the hopper and to form an arch therein whereby there would be a non-uniform feeding of the material from the hopper to the conveyor. As a consequence, the conveyor was not fed with material from the hopper and improper operation of the device resulted. This deficiency has been overcome by our invention by providing an auxiliary hopper which in effect forms the bottom portion of the discharge hopper, and subjecting this auxiliary hopper to vibrations which eliminate the tendency for the material to arch or cake.

Referring particularly to Fig. 1 of the drawings, there is seen at A an independently supported stationary hopper or any similar container adapted to hold material, such as granular material or material made up of small particles, examples of which are chemical salts, grain (such as rice and wheat), crushed stone, coal and numerous other materials.

Adjacent the bottom of the hopper A, there is provided an auxiliary hopper B which may be considered as constituting a part of said stationary hopper A. The auxiliary hopper B feeds material into the pan of a vibratory conveyor C, which is generally of the type disclosed in the application of James A. Flint, Serial No. 727,770, for Method of and apparatus for transferring material, filed May 26, 1934.

The vibratory conveyor C comprises a deck or pan 10 having a bottom wall 11 and a pair of upright side walls 12 (Fig. 4). The general configuration of pan 10 adjacent its discharge end is best seen in Fig. 4, but it is to be understood that any desired configuration may be employed. Adjacent its feed end, the pan 10 has the side walls 12 extending upwardly and outwardly as seen at 12' in Fig. 5, whereby the material receiving portion, or feed end, of said pan has an increased depth.

Said pan 10 is preferably mounted upon metal leaf spring cantilevers 13 which make an acute angle with the plane formed by the bottom 11 of said pan. Said cantilevers 13 are rigidly attached to downwardly projecting metal bosses 14 on the metal pan 10 by any desired attaching means, such as screws 15. Adjacent their bottoms, the cantilevers 13 are rigidly attached to a heavy metal base 16 by appropriate screws 17 co-operating with metal bosses 18 on said base. The base 16 is preferably mounted upon legs 19 made of flexible material, such as rubber.

As was described in detail in the above mentioned application of James A. Flint, the base 16 has a weight which is preferably at least twice the weight of the pan 10 and any parts rigidly attached to said pan. The cantilevers 13 are preferably of spring steel whereby, upon their being deflected, energy is stored therein which may be employed to vibrate the pan 10.

Adjacent its rear end, the pan 10 is provided with a bracket 20 to which is rigidly attached an armature 21, preferably made of laminated transformer steel. Adjacent the rear end of the base 16, there is provided an upstanding bracket 22 which carries at its top a magnetic core 23 upon which is wound a field coil 24. A hood 25 is carried by the bracket 20 and extends over the field coil 24, thereby protecting said field coil. Said field coil 24 has its terminals connected to a plug 26 which is adapted to be plugged into the standard wall plug receptacle.

As was described in considerable detail in the above application of James A. Flint, the deck 10, together with the cantilevers 13, are so constructed that it has a natural period of vibration which is approximately, but not exactly, equal to the frequency at which it is to be oscillated. That is, the pan 10 and the cantilevers should provide a natural period slightly different from the period at which it is to be vibrated. The armature 21, the field coil 24 and the magnetic core 23 provide an alternating current vibrator or vibratory motor which is adapted, when energized from a source of alternating current, such as a source of commercial alternating current of 60 cycles, to impart periodic vibrations to the deck 10. The frequency of vibration of said deck 10 will be twice the frequency of the energizing source for the motor 27. For example, if a 60-cycle source is employed, the frequency of the deck 10 will be 7,200 cycles per minute. This is due to the fact that the armature 21 will be attracted twice during each cycle of the electric current and, when the current goes through zero in its cycle of operation, it will be effective to release said armature 21 and allow the energy stored up in the cantilevers 13 to vibrate said deck 10.

The construction of the auxiliary hopper B is best seen in Figs. 1 and 6, and comprises a substantially vertical front wall 28, sloping side walls 29 and sloping rear wall 30. The side walls 29 and the rear wall 30 provide a bottom opening 31 and said walls 29 and front walls 28 provide a front opening 32. As is illustrated in Figs. 1, 3, 5 and 6 of the drawings, the side walls 29 and the rear wall 30 terminate a short distance above the bottom wall 11 of the pan 10. This provides for complete freedom of movement of said pan 10 with respect to the auxiliary hopper B. Adjacent the front opening 32, there is provided a variable gate comprising a plate 33 having an outwardly projecting lift or handle portion 34. A strap 35 extends across the front of the auxiliary hopper B between the two side walls 29 and the plate 33 is vertically slidable between said strap 35 and the front wall 28. A pair of wing screws 36 is provided for adjustably retaining the plate 33 in any selected position. It is evident that the plate 33 may be vertically adjusted to determine the size of the front opening 32 and the wing screws 36 clamp this plate 33 in any selected position.

The auxiliary hopper B is connected to the side walls 12' by a flexible strip 37 which may be made of rubber or canvas. This strip is attached to the side walls 12', as by a strap 38 and screws 39, and is similarly attached to the auxiliary chute B by the strap 40 and the screws 41. It is thus evident that the auxiliary hopper B is entirely free for movement with respect to the pan 10 though there is a flexible connection therebetween which will prevent the flowing out of any small particles of material which is being fed.

Adjacent its top, the auxiliary hopper B is flexibly attached to the bottom of the hopper A by a flexible strip 42 which goes completely around the circumference of the auxiliary hopper A and is rigidly attached to a top flange thereof by an appropriate strap 43 and bolts 44. The free edge of said strip 42 makes a frictional engagement with the tapering end 45 of the stationary hopper A. Said flexible strip 42 is preferably made of canvas or rubber and thus provides a dust-proof flexible connection between the stationary hopper A and the auxiliary hopper B.

Adjacent the sides of auxiliary hopper B, there is provided a pair of brackets 46 (Fig. 6) which are rigidly attached to the side walls 29 thereof, as by welding. Extending upwardly from the base 16 is a bracket 47 which is substantially U-shaped, as seen in Fig. 6, and which is rearwardly bent from its bottom portion, as seen in Fig. 1. The bracket 47 is rigidly attached at its bottom to the base 16, as by bolts 48, and the free ends of said bracket 47 are rigidly attached to the brackets 46, as by bolts 49.

From the above construction, particularly that provided by the bracket 47, it is seen that the auxiliary hopper B is supported from the base 16 by the bracket 47 and is also rigidly attached to said base 16 by said bracket 47.

In the operation of the device it has been found that the vibrations of the motor 27 are imparted principally to the deck 10 as the latter has a period of vibration near to, though not exactly equal to, the period of vibration imparted thereto by the motor 27. As was previously mentioned, the base 16 is much heavier than the deck 10 and is preferably at least twice as heavy. As a consequence, most of the energy of the motor 27 will be employed to vibrate the pan 10 but, as the base 16 does not have an infinite weight, it is inevitable that some of the energy will manifest itself by vibration of said base 16. In prior devices, no use was made of these vibrations in the base 16 but in our invention they have been put to a useful purpose and through the intermediary of the bracket 47 are employed to impart vibrations to the auxiliary hopper B.

In the operation of our device, the hopper A will be filled with material, which material will flow into the auxiliary hopper B. Due to the large unobstructed opening in the hopper A, there will be no appreciable tendency for the material to cake or arch therein. Said material will therefore also fill the auxiliary hopper B. When the electric motor 27 is energized from a source of alternating current, the pan 10 will be vibrated and due to the angular position of the cantilevers 13, will effect a conveying action on any material resting on the bottom 11 thereof. The motor 27, in operating, not only vibrates the pan 10 but also slightly vibrates the base 16. These slight vibrations of the base 16 are then imparted to the auxiliary hopper B through the intermediary of the bracket 47. This vibration of the auxiliary hopper B will prevent any tendency for the material to cake or arch therein and will insure a continuous presence of material on the pan 10 adjacent the bottom opening 31 of said auxiliary hopper B.

The rate of flow of the material along the pan 10 may be adjusted by controlling the plate 33, forming a gate on the auxiliary hopper and/or by controlling the amplitude of vibration of the pan 10. Said amplitude of vibration of the pan 10 may be controlled by inserting a manually adjustable resistor in series with the field coil 24.

Obviously those skilled in the art may make various changes in the details and arrangement of parts without departing from the spirit and scope of the invention as defined by the claims hereto appended, and we wish therefore not to be restricted to the precise construction herein disclosed.

Having thus described and shown an embodiment of our invention, what we desire to secure by Letters Patent of the United States is:

1. In a vibratory feeder, the combination with a vibratory conveyor deck, of a base, spring means attaching said deck and base whereby said deck will have a conveying action when vibrated, a vibratory motor having a portion attached to said base and another portion attached to said deck, a hopper adapted to feed material to said deck, and means connecting said hopper and said base whereby vibrations in said base will be imparted to said hopper.

2. In a vibratory feeder, the combination with a vibratory conveyor deck, of a relatively heavy mass forming a base, leaf springs connecting said base and deck and making an acute angle with the deck bottom, a motor for vibrating said deck and said base, means for feeding material to said deck, and means attaching said base to said feeding means whereby vibrations in said base will be imparted thereto.

3. In a vibratory feeder, the combination with a vibratory conveyor adapted to convey material without the aid of gravity and having a deck and a base, of a hopper for feeding material thereto, means for vibrating both said deck and said base, and means for attaching said base and said hopper whereby vibrations imparted to said base will be transferred to said hopper.

4. In a vibratory feeder, the combination with a vibratory conveyor adapted to convey material without the aid of gravity and having a deck and a base, of means for feeding material thereto, means for vibrating both said deck and said base, and means for attaching said base and said feeding means whereby vibrations imparted to said base will be transferred to said first mentioned means.

5. In a vibratory feeder, the combination with a vibratory conveyor deck, of a base, leaf spring means connecting said base and deck and making an acute angle with the deck bottom, a hopper having a discharge opening directed toward said deck, flexible means for attaching said hopper and deck, means for attaching said base to said hopper whereby vibrations in the latter will be transferred to the former, and a motor comprising an alternating current vibrator for vibrating said deck and said base.

6. In a vibratory feeder, the combination with a vibratory conveyor deck, of a base, leaf spring means connecting said base and deck and making an acute angle with the deck bottom, a hopper having a discharge opening directed toward said deck, flexible means for attaching said hopper and deck, means for attaching said base to said hopper whereby vibrations in the latter will be transferred to the former, and a motor for vibrating said deck and said base.

7. In a vibratory feeder, the combination with a vibratory feeder adapted to feed material without the aid of gravity and including a deck, of a relatively heavy base, leaf spring means connecting said base and deck, a hopper having a discharge end extending into said deck having an open bottom and a front opening of variable size, flexible means attaching said hopper and deck, means for attaching said base to said hopper whereby vibrations in the latter will be transferred to the former, and a motor for vibrating said deck and base.

8. In a vibratory feeder, the combination with a vibratory feeder adapted to feed material without the aid of gravity and including a deck, of a relatively heavy base, leaf spring means connecting said base and deck, a hopper having a discharge end extending into said deck having an open bottom and a front opening, flexible means attaching said hopper and deck, means for attaching said base to said hopper whereby vibrations in the latter will be transferred to the former, and a motor for vibrating said deck and base.

9. In a vibratory feeder, the combination with a main hopper, of an auxiliary hopper positioned to be fed by said main hopper, flexible means connecting said hoppers to make a continuous wall therebetween, a conveyor of the vibratory type capable of conveying material without the aid of gravity, comprising a deck and a base, said deck being positioned to receive material from said auxiliary hopper, means flexibly attaching said auxiliary hopper and said deck, means connecting said base and said auxiliary hopper whereby vibrations in the former will be imparted to the latter, and a vibratory motor for vibrating said deck and said base.

10. In a vibratory feeder, the combination with a main hopper, of an auxiliary hopper positioned to be fed by said main hopper, flexible means connecting said hoppers to make a continuous wall therebetween, a conveyor of the vibratory type capable of conveying material without the aid of gravity, comprising a deck and a base, said deck being positioned to receive material from said auxiliary hopper, means connecting said base and said auxiliary hopper whereby vibrations in the former will be imparted to the latter, and a vibratory motor for vibrating said deck and said base.

11. In a vibratory feeder, the combination with a main hopper, of an auxiliary hopper positioned to be fed by said main hopper, flexible means connecting said hoppers to make a continuous wall therebetween, a conveyor of the vibratory type capable of conveying material without the aid of gravity, comprising a deck and a base, said deck being positioned to receive material from said auxiliary hopper, means connecting said base and said auxiliary hopper whereby vibrations in the former will be imparted to the latter, and a motor for vibrating said deck and said base.

12. In feeding apparatus, the combination with a relatively heavy base, of a relatively light conveyor trough mounted thereon, means for vibrating said base and said conveyor trough to effect transfer of material along the latter, means for directing material to said conveyor trough, and mechanism for supporting said directing means on said base to cause vibration of said base to be imparted to said directing means.

13. In a vibratory feeder, the combination with a substantially horizontal vibratory conveyor deck, of a base, spring means attaching said deck and base whereby said deck will have a conveying action when vibrated, a hopper positioned to feed material to said deck, means supporting said hopper independently of said deck and pulsating electromagnetic means connected to both said hopper and said deck to cause their vibration at a frequency not less than 3,000 cycles per minute thereby to insure a continuous feeding of material from said hopper to said deck and from said deck.

14. In a vibratory feeder, the combination with a substantially horizontal vibratory conveyor deck, of a base, spring means attaching said deck and base whereby said deck will have a conveying action when vibrated, a hopper positioned above said deck and having a restricted discharge outlet directing material to said deck, means supporting said hopper independently of said deck, and pulsating electro-magnetic means operable at a frequency not less than 3,000 cycles per minute and connected to both said hopper and said deck to cause their vibration always together thereby to insure a continuous feeding of material from said hopper to said deck and from said deck.

15. In a vibratory feeder, the combination with a vibratory conveyor deck, of a base, inclined spring means attaching said deck and base whereby said deck will have a conveying action when vibrated, a hopper positioned above said deck and having a lower opening positioned to feed material to said deck, frame means for supporting said hopper independently of said deck and attached to said base, and electro-magnetic vibratory means connected to said deck and said hopper for vibrating them.

16. In a vibratory feeder unit, the combination with a supporting frame comprising a metal base and upwardly extending arms, of a hopper mounted on said arms, a vibratory electro-magnetic feeder carried on said frame and positioned therebetween with its material receiving end positioned to receive material from said hopper, said entire feeder forming a complete unit, and shock absorbing feet on said metal base.

17. In a portable feeder unit, the combination with a portable frame, of a hopper mounted on said frame, a feeder having a horizontal deck and mounted on said frame and positioned to be fed by said hopper, and electro-magnetic means constructed and arranged to vibrate both said feeder and said hopper always together thereby to insure a continuous feed of material.

18. In a feeder unit, the combination with a base, of a substantially horizontal trough type conveyor deck, inclined spring means supporting said deck from said base whereby said deck will impart a conveying action to any material thereon, supporting bracket means extending upwardly from said base and on each side of said deck, a hopper carried by said bracket means above said deck and having a bottom portion extending into said deck trough and feeding material to said feeder, and electro-magnetic means for vibrating said deck and said hopper always together to insure proper feeding of material from said hopper and deck.

19. A portable feeder unit comprising a portable frame formed of a metal base and upstanding side brackets, a trough shaped deck, inclined spring means for supporting said deck from said base with said deck substantially horizontal, a hopper carried by said side brackets and having a bottom extending into said trough with its bottom edge below the trough top, means for adjusting the rate of feed of the material from said hopper to said trough and electro-magnetic means for vibrating said deck and said hopper always together, to insure proper feeding of material from said hopper and deck.

20. A vibratory feeder unit, comprising a metal base, a vibratory deck positioned above said base, spring leaf means connected between said deck and base and forming an acute angle with the plane of said deck, continuous circuit non-rotary electro-magnetic vibratory means for vibrating said deck, a hopper positioned above said deck having a bottom positioned to feed material onto said deck, arms extending upwardly from said base and on each side of said deck and supporting said hopper from said base, and shock absorbing feet, on said base to prevent a transfer of vibrations in said base to any support on which said feet rest.

21. In a feeder unit, the combination with a vibratory feeder having a substantially horizontal deck, spring means supporting said deck for vibratory movement having both a horizontal and vertical component of movement to effect a conveying action on material carried by said deck, a hopper positioned above said deck and positioned to feed material thereto, frame means for supporting said deck and hopper in predetermined relative positions, vibration absorbing feet for said frame means, and electro-magnetic means for imparting vibratory motion to said deck and hopper always together to insure a proper feeding of material.

22. In a feeder unit, the combination with a vibratory feeder having a substantially horizontal deck, spring means supporting said deck for vibratory movement having both a horizontal and vertical component of movement to effect a conveying action on material carried by said deck, a hopper positioned above said deck and positioned to feed material thereto, frame means for supporting said deck and hopper in predetermined relative positions, and electro-magnetic means for imparting vibratory motion to said deck and hopper always together to insure a proper feeding of material.

23. In a vibratory feeder, the combination with a vibratory conveyor adapted to convey material without the aid of gravity and having a deck, of a hopper for feeding material thereto, means supporting said hopper independently of and out of contact with said deck, and means comprising a single vibratory electro-magnetic motor for vibrating both said deck and said hopper, said means including elements constructed and arranged to impart vibration to said hopper independently of said deck.

24. In a vibratory feeder, the combination with a vibratory conveyor adapted to convey material without the aid of gravity and having a deck with a substantially horizontal conveying surface, of means for feeding material thereto, means supporting said feeding means independently of and out of contact with said deck, and vibratory electric motor means for vibrating both said deck and said feeding means.

JAMES A. FLINT.
ARTHUR D. HOLT.